United States Patent [19]

Maisner

[11] 3,779,718

[45] Dec. 18, 1973

[54] CORROSION RESISTANT THERMOSTATIC LAMINATE

[75] Inventor: Leonard S. Maisner, Dearborn Heights, Mich.

[73] Assignee: W. M. Chace Company, Detroit, Mich.

[22] Filed: Oct. 2, 1972

[21] Appl. No.: 294,086

[52] U.S. Cl. .............................................. 29/195.5
[51] Int. Cl. ............................................. B23p 3/00
[58] Field of Search ................................... 29/195.5

[56] References Cited
UNITED STATES PATENTS

| | | | |
|---|---|---|---|
| 1,652,546 | 12/1927 | Vaughan | 29/195.5 |
| 1,993,020 | 3/1935 | Scott | 29/195.5 |
| 2,240,824 | 5/1941 | Alban | 29/195.5 |
| 2,403,895 | 7/1946 | Alban | 29/195.5 |

*Primary Examiner*—Hyland Bizot
*Attorney*—Norman J. O'Malley et al.

[57] ABSTRACT

An improvement is disclosed for a bimetal consisting essentially of a high expanding nickel-copper-manganese alloy with controlled ratios of nickel, copper, and manganese bonded along a common interface to a low expanding nickel-cobalt-iron alloy also having a narrow weight range for each component. The improvement comprises providing a corrosion resistant thermostatic laminate having high flexivity and high electrical resistivity by metallurgically bonding an alloy consisting essentially of from about 19 to about 23 percent nickel, from about 1.5 to about 3.5 percent chromium and the balance iron along a common interface to the side of the high expanding alloy that opposes the low expanding alloy.

3 Claims, No Drawings

CORROSION RESISTANT THERMOSTATIC LAMINATE

BACKGROUND OF THE INVENTION

The invention relates to metallic laminates which function in thermostatic applications as bimetals. More particularly, it relates to a thermostatic laminate which is corrosion resistant and has high flexivity and high electrical resistivity.

Bimetallic elements are used in numerous thermostatic applications. As technology changes, however, the properties of the bimetallic elements often have to be changed to enable the thermostatic element to perform properly. One such instance is outlined in copending U.S. Patent Application Ser. No. 117,168 by Edward W. Bloch and assigned to the same assignee as this invention. While the new bimetal invented therein has the desired characteristics of flexivity, in some applications where high humidity exists the bimetal can fail due to corrosion. Another bimetallic material which has a higher flexivity than that disclosed in the foregoing application is disclosed in copending U.S. Patent Application Ser. No. 244,531. The assignee is the parent of the assignee of the present application and a supplier of the alloys used therein. The flexivity of the last bimetal is higher than prior bimetals, however, corrosion can be a problem in some instances as with the bimetal described in Ser. No. 117,168.

Carburetor choke mechanisms employ bimetallic elements and the problems with older bimetallic elements when used in the newer model combustion controlled engines are described by E. W. Bloch in the foregoing application Ser. No. 117,168. Many of these mechanisms are subjected, however, to high humidity conditions and failures can occur with the bimetallic elements previously known when used in the carburetor choke mechanisms or else the flexivities thereof do not have the proper characteristics.

It is believed, therefore, that a corrosion resistant thermostatic laminate which has the desired characteristics of high flexivity and high electrical resistance for the newer choke mechanisms would be an advancement in the art.

OBJECTS AND SUMMARY OF THE INVENTION

It is an object of this invention to provide a corrosion resistant laminate which functions as a bimetal with a high flexivity.

It is another object of this invention to provide an improvement to a thermostatic element by providing a laminate to achieve corrosion resistance while attaining a high flexivity.

It is a further object of this invention to provide a corrosion-resistant laminate having a flexivity of at least about $21.5 \times 10^{-6}$ within the temperature range of about $-70°$ to about $750°$ C.

These and other objects of this invention are achieved in one aspect of this invention by providing an improvement to a bimetallic element consisting essentially of a high expanding nickel-copper-manganese alloy having from about 15.5 to about 22.5 percent by weight of nickel, the sum of the weight percent of copper and one-half the weight percent of nickel being from 13.75 to 16.75 and the balance manganese, which is metallurgically bonded to a common interface to a low expanding alloy consisting essentially of nickel, cobalt and iron wherein nickel is from 30.75 to 31.75 percent by weight and cobalt is from 6.5 to 8.5 percent by weight with minor inclusions of from 0.05 to 0.5 percent of manganese, 0.015 to 0.12 percent carbon, from 0.015 to 0.15 silicon and balance iron. The improvement comprises providing a laminate by metallurgically bonding an alloy consisting essentially of from about 19 to about 23 percent by weight of nickel, from about 1.5 to about 3.5 percent by weight of chromium and the balance iron along a common interface to the side of the high expanding alloy opposing the side bonded to the low expanding alloy.

DETAILED DESCRIPTION OF THE PREFERRED EMBODIMENTS

For a better understanding of the present invention, together with other and further objects, advantages and capabilities therof, reference is made to the following disclosure and appended claims in connection with the above description of some of the aspects of the invention.

Flexivity is the measure of the amount a thermostatic material such as a bimetal deflects over a temperature range. It is generally measured by testing a known length of material then measuring the total distance a movable end deflects over the temperature range while the opposing end is held stationary. The bimetallic element currently used in most carburetor choke coils has a flexivity of about $21.4 \times 10^{-6}$ over the temperature range of from about $-70°$ C to about $750°$ C. When a layer of an alloy consisting essentially of about 22 percent by weight of nickel, about 3 percent by weight of chromium, balance iron is metallurgically bonded to the high expanding alloy, the resulting tri-layered laminate has a flexivity of about $18.7 \times 10^{-6}$ over the same temperature range which is too low for proper combustion control when used for carburetor choke coil application on the new internal combustion engines.

It has been determined, however, when an alloy of about 22 percent nickel, about 3 percent chromium and balance iron is bonded to the high expanding side of a bimetal as described hereinafter, the resulting tri-layered laminate has a flexivity of at least about $21.5 \times 10^{-6}$ over the foregoing temperature range. The laminate is resistant to high humidity corrosion, has an electrical resistivity of about 589 ohms · cmil/ft and is more weldable than the bimetal heretofore used. The high expanding alloy is described in detail in co-pending U.S. Patent Application Ser. No. 244,530 by George J. Majesko and is assigned to the parent of the assignee of the present invention. The alloy is a nickel-copper-manganese alloy having a nickel content of from about 15.5 percent by weight to about 22.5 percent by weight, the sum of the weight percent of copper and one-half of the weight percent of nickel is from about 13.75 percent to about 16.75 percent and the balance is manganese. The low expanding alloy is also an alloy with relative close tolerance level and is a nickel-cobalt-iron alloy with narrow ranges of each component. The nickel content can vary from about 30.75 percent to about 31.75 percent by weight, the cobalt content from about 6.5 percent to about 8.5 percent by weight along with manganese being between 0.05 and 0.5 percent by weight, carbon is between about 0.015 to 0.12 percent by weight and silicon is between about 0.015 to about 0.15 percent. The balance of the alloy except for the components previously mentioned is iron. Slight variations outside the above specified limits on the components can result in major changes in the flexivity and other properties of the laminate.

The alloy layer that provides corrosion resistant and yields a laminate having suitable flexivity and electrical resistance properties is a corrosion resistant alloy consisting essentially of about 22 percent by weight of nickel, about 3 percent by weight of chromium and the balance iron. The amount of the components in the alloy can not be altered to any appreciable degree because the flexivity or the corrosion resistance are appreciably changed, thus, rendering the laminate unsuitable for the newer choke mechanisms. The nickel can be varied from about 19 percent to about 23 percent and the chromium from 1.5 percent to about 3.5 percent and the balance iron and the benefits of this invention, namely a flexivity of at least 21.5 × $10^{-6}$ and a freedom of stress corrosion cracking are still achieved. Larger variations result in unsuitable flexivity for modern choke mechanisms. It is preferred, however, that the nickel content be between about 21.5 to 22.5 percent and the chromium content be from about 3.1 to about 3.3 percent by weight.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a bimetal having a high deflection comprising a high expanding side of a nickel-copper-manganese alloy consisting essentially of from about 15.5 percent to about 22.5 percent by weight of nickel, the sum of the copper content in percent by weight and one-half the nickel content in percent by weight being from about 13.75 to about 16.75 percent and the balance manganese, and metallurgically bonded to a first common interface of said high expanding side, a low expanding side of an alloy consisting essentially of in percent by weight:

| | |
|---|---|
| nickel | 30.75 to 31.75 |
| cobalt | 6.5 to 8.5 |
| manganese | 0.05 to .5 |
| carbon | 0.015 to .12 |
| silicon | 0.015 to .15 |
| iron | balance | the improvement comprising providing a corrosion resistant thermostatic laminate by metallurgically bonding a third alloy consisting essentially of from about 19 to about 23 percent by weight of nickel, from about 1.5 to about 3.5 percent by weight of chromium and the balance of said laminate iron to the side of the higher expanding alloy that is opposite to the low expanding alloy, said laminate having a flexivity of at least about 21.5 × $10^{-6}$ within the temperature range of from about −70° to about 750° C.

2. A laminate according to claim 1 wherein said third alloy has a nickel content of from about 21.5 to about 22.5 percent.

3. A laminate according to claim 2 wherein said third alloy has a chromium content of from about 3.1 to about 3.3 percent by weight.

* * * * *